United States Patent
Touzel et al.

[19]

[11] Patent Number: 6,079,452
[45] Date of Patent: Jun. 27, 2000

[54] PIPE COATING

[75] Inventors: John James Touzel, Gillingham; Thomas Christopher Arnott, Alloa, both of United Kingdom

[73] Assignee: Liquid Polymers Group, United Kingdom

[21] Appl. No.: 08/564,226

[22] PCT Filed: Jun. 7, 1994

[86] PCT No.: PCT/GB94/01235

§ 371 Date: Mar. 12, 1997

§ 102(e) Date: Mar. 12, 1997

[87] PCT Pub. No.: WO94/29634

PCT Pub. Date: Dec. 22, 1994

[30]     Foreign Application Priority Data

Jun. 7, 1993 [GB] United Kingdom ................... 9311715

[51] Int. Cl.[7] .................................................. F16L 9/147
[52] U.S. Cl. ........................... 138/149; 138/146; 427/409
[58] Field of Search .................................. 138/137, 149, 138/146, 141; 427/385.5, 409

[56]                References Cited

U.S. PATENT DOCUMENTS

| | | | |
|---|---|---|---|
| 1,513,723 | 10/1924 | Bohlander ................................ | 138/149 |
| 3,731,710 | 5/1973 | Bauer et al. ............................. | 138/141 |
| 3,811,478 | 5/1974 | Ahlqvist .................................... | 138/132 |
| 3,830,899 | 8/1974 | Piccioli et al. .......................... | 138/141 |
| 3,902,531 | 9/1975 | Thawley .................................... | 138/137 |
| 4,351,365 | 9/1982 | Bauermeister et al. ................. | 138/149 |
| 4,587,145 | 5/1986 | Kanao ....................................... | 138/137 |
| 5,795,634 | 8/1998 | Fukui ........................................ | 138/137 |

*Primary Examiner*—James Hook
*Attorney, Agent, or Firm*—Wendy K. Buskop; Buskop Law Group

[57]               ABSTRACT

A method of applying a thermally insulating coating to a pipe (10) or the like, comprises the steps of applying a thermally insulating foam material (14) to the pipe in a plurality of discrete segments over the surface area of the pipe, and applying an outer protective coating of water-proof elastomeric material (18) which bonds to the pipe between said segments, fills the gaps therebetween and forms an outer layer encapsulating the thermally insulating foam. The foam may be applied as annular bands extending around the circumference of the pipe, applied by ribbon pouring. The encapsulation of the foam (14) by the elastomer (18) allows the use of foams such as polyurethane foam having poor resistance to water ingress under hydrostatic pressure, since any ingress will be limited to individual encapsulated foam segments. Additional coating layers may include an anti-corrosion coat (12), a high temperature barrier layer, an impact shock absorbing coat or intermediate elastomer layers.

17 Claims, 2 Drawing Sheets

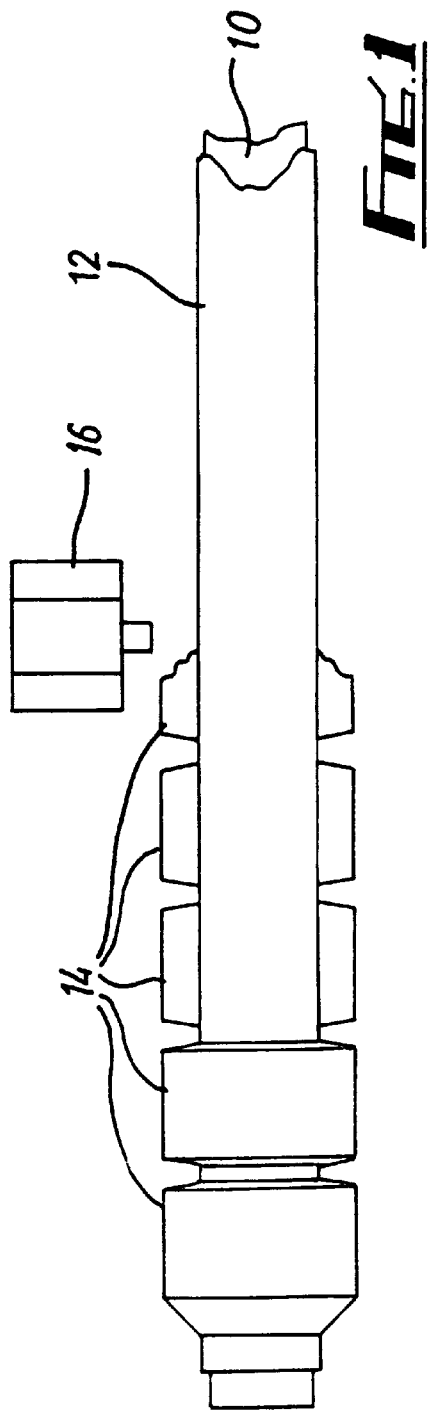
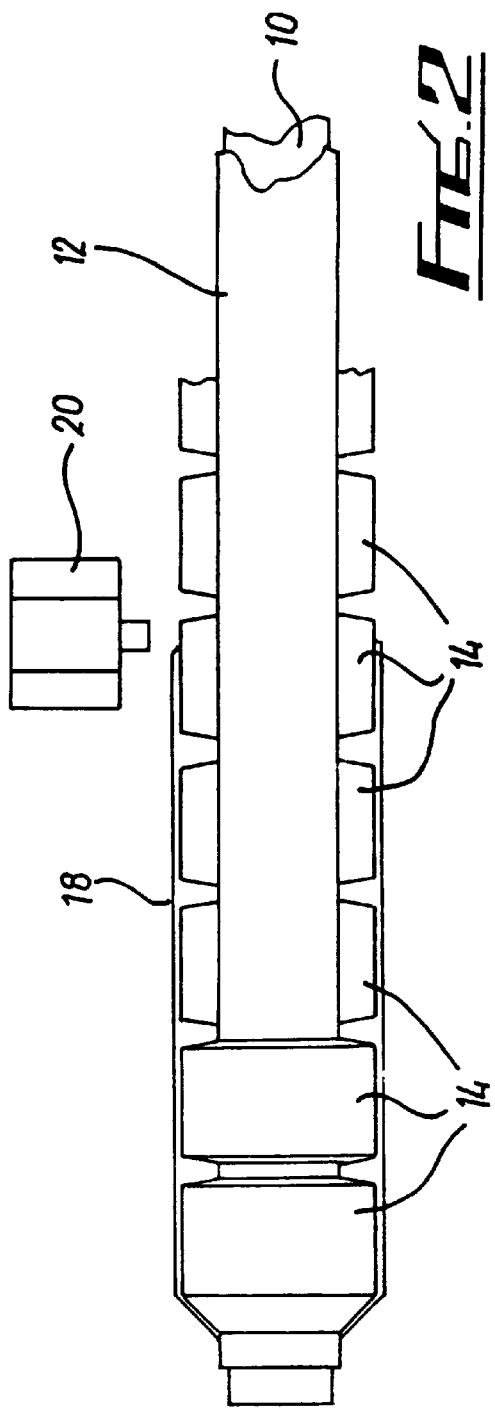

PIPE COATING

This invention relates to the coating of pipelines and the like, particularly subsea pipelines and risers, but also other forms of ducting and piping, for the purpose of providing thermal insulation. The invention provides an improved coating method and an improved coated pipeline formed thereby.

Oil and gas are transported by steel pipes from subsea wells to fixed platforms or moored floating platforms. The oil and gas temperature at the wellhead is in the range of temperatures between 70° C. and 130° C. The sea temperature at seabed level of the North Sea is in the range of temperatures of between 4° C. and 8° C. Over a relatively short distance the oil and gas temperature is reduced to the surrounding sea temperature. This in turn increases oil viscosity and solidifies any waxes present, and in the case of gas will produce hydrate formation, drastically reducing flow and possibly causing blockage of the line.

Methods of overcoming these problems in the past have included:

a. The injection of chemicals at the wellhead to prevent waxes forming. This method is expensive and not always effective, and is environmentally unacceptable as chemicals are entrained in the water which is present in oil wells and which is separated and dumped into the sea.

b. The "pipe in a pipe" method consists of placing the oil pipe into a larger diameter pipe concentrically. The annulus formed is filled with a polyurethane foam. Polyurethane foam produces good insulating values but is low in mechanical strength and unable to resist seawater, therefore an outer steel pipe is required to provide resistance to hydrostatic forces and produce a waterproof barrier. This method of construction restricts the way a pipeline can be installed and is most suited to shallow water and short lengths of lines.

c. Syntactic insulation is achieved by dispersing microspheres or insulating material particles into a matrix of elastomer plastic or epoxy. The introduction of microspheres or insulation particles into such a matrix greatly reduces the physical properties of the matrix material. The maximum amount normally considered acceptable is approximately 40% which improves the thermal insulation property of the matrix but in many instances not significantly enough to meet common insulation requirements.

d. Laminated systems consist of a first layer of elastomer, normally extruded onto the pipe, a layer of insulation material, such as PVC foam or a similar closed cell foam able to resist hydrostatic pressures, followed by a further coat of elastomer. PVC foam has been applied in the past in the form of pre-formed, part-cylindrical shells and as helically wound strip of relatively thin material. The latter requires multiple layers to be applied. The assembled system is placed into an autoclave and cured under temperature and pressure to crosslink the elastomer and form a bond between the insulation material and the pipe. The laminated system produces a thermally efficient coating but has disadvantages. Spaces exist at the joints of the insulation material which are not filled by the elastomer. During the autoclaving, entrapped air can cause blistering of the outer cover of elastomer. If the outer coating, which is generally of low mechanical property, is breached during installation or on the sea bed, water floods the helical or circumferential joints and penetrates any striations in the insulation destroying thermal efficiency of the system.

The good insulating properties and compressive strength of high density polyurethane foam are widely recognised. However, its use in pipeline coatings has been restricted by its poor resistance to water ingress under hydrostatic pressure. This means that the foam must be encapsulated in a water-tight outer sleeve (pipe-in-a-pipe as discussed above) or coating (such as solid polyurethane elastomer), and makes the foam matrix liable to flooding in the event that the integrity of the outer coating is comprised by impact or stress either during installation or whilst on the sea-bed. Unprotected polyurethane foam will flood completely in a matter of hours and will thus lose all insulation properties. The further problems associated with the pipe-in-a-pipe approach are discussed briefly at (b) above.

It is an object of the present invention to provide an improved pipe-coating method and an improved coated pipe, allowing the use of polyurethane foam (or other foam materials having poor resistance to water ingress) as the insulating medium.

In accordance with a first aspect of the present invention there is provided a method of applying a thermally insulating coating to a pipe or the like, comprising the steps of applying a thermally insulating foam material to the pipe in a plurality of discrete segments over the surface area of the pipe, and applying an outer protective coating of water-proof elastomeric material which bonds to the pipe between said segments, fills the gaps therebetween and forms an outer layer encapsulating the thermally insulating foam.

The thermally insulating material is preferably applied to the pipe by the ribbon-pour (or rotational cast) method.

Most preferably, the thermally insulating material is applied in annular bands spaced along the length of the pipe.

The outer elastomer material is preferably also applied by the ribbon-pour method.

Preferably also, both the thermally insulating and outer elastomer materials are applied from programmable applicator heads, whereby the materials may be applied to the pipe in predetermined patterns and to predetermined thicknesses.

Preferably also, an anti-corrosion layer is applied to the pipe prior to the application of said thermally-insulating and outer elastomer materials.

The thermally insulating material is most preferably polyurethane foam. The outer elastomer is preferably solid polyurethane elastomer. The anti-corrosion layer is preferably fusion bonded epoxy or elastomer.

Preferably also, a high temperature barrier layer is applied to the pipe prior to the application of said thermally-insulating and outer elastomer materials.

Preferably also, an impact shock absorbing layer is applied to the pipe prior to the application of said thermally-insulating and outer elastomer materials.

Preferably also, a layer of elastomer material is applied to the pipe prior to the application of said thermally-insulating and outer elastomer materials.

In accordance with a second aspect of the invention, there is provided a thermally insulating pipe or the like, comprising a pipe having a thermally insulating foam material applied thereto in a plurality of discrete segments distributed over the surface thereof and encapsulated in a protective layer of elastomer material bonded to the pipe and filling the gaps between said segments.

Preferably, said pipe further includes an anti-corrosion layer applied to the pipe prior to said thermally insulating and elastomer materials.

The preferred pattern of said segments and various materials are as defined above in relation to the first aspect of the invention.

An embodiment of the invention will now be described, by way of example only, with reference to the accompanying drawings, in which:

FIG. 1 is a schematic side view, partly in section, showing the application of thermally insulating material to a pipe in accordance with the present invention;

FIG. 2 is a schematic side view, partly in section, showing the application of an outer elastomer coat to the pipe of FIG. 1, in accordance with the invention;

Figure 3:
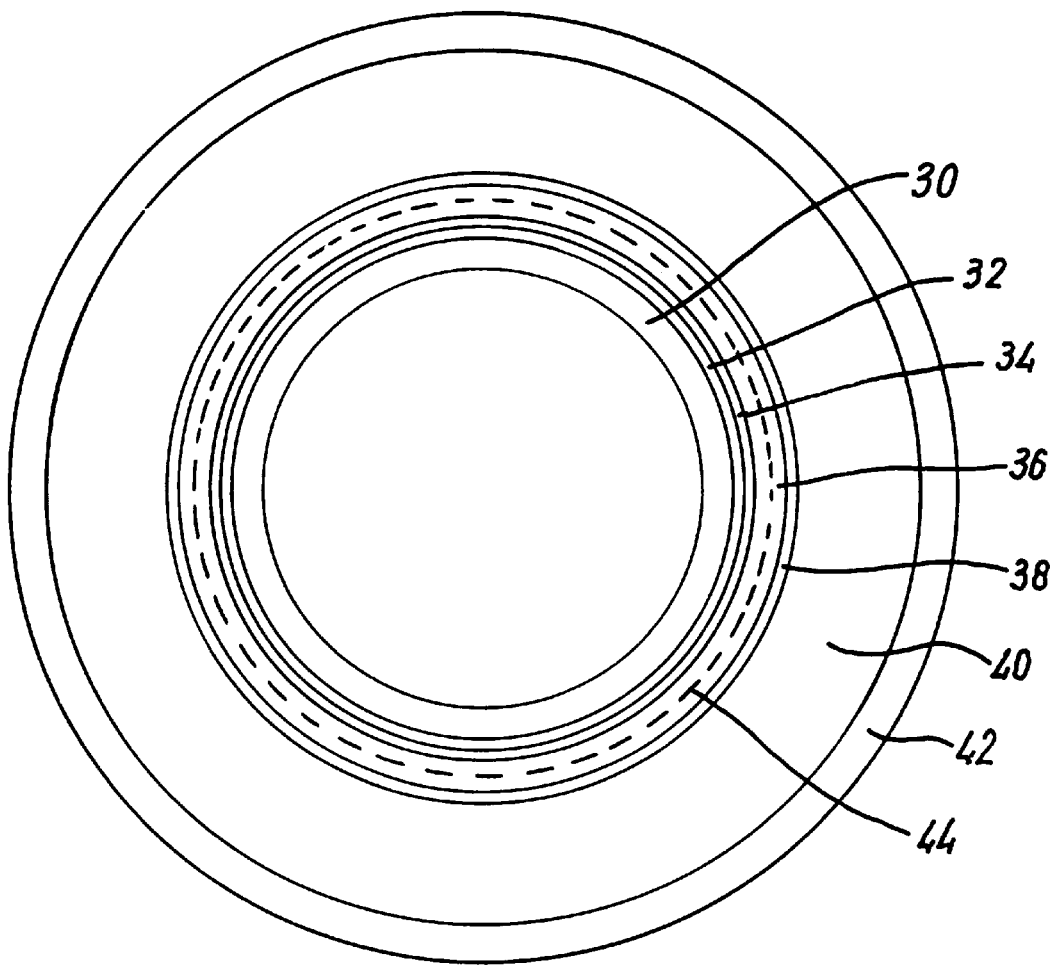
FIG. 3 is a schematic cross-sectional view of an embodiment of a pipe coated in accordance with the invention, including various optional coating layers.

Referring now to the drawings, FIG. 1 shows a pipe 10, having an anti-corrosion layer 12 (typically of fusion bonded epoxy or elastomer) applied uniformly to its surface. The pipe is mounted for rotation about its longitudinal axis for the application of coating materials by the ribbon-pour method, as is well known in the art.

In accordance with the invention, thermally-insulating foam material (most preferably polyurethane foam) is applied to the pipe 10 in a series of annular bands 14 spaced along the length of the pipe 10. The foam is applied from an applicator head 16, suitably a high pressure, self-cleaning mixing head. The applicator head 16 can be programmed to automatically interrupt the flow of foam in a predetermined cycle, whereby the foam is applied in discrete segments distributed over the surface of the pipe with gaps therebetween.

FIG. 2 shows the application of an outer layer of elastomer material 18 (suitably solid polyurethane elastomer) on top of the thermally insulating foam bands 14. The elastomer 18 can be applied by a similar applicator head 20 to that of FIG. 1. In this case the applicator head 20 is programmed to pause at positions corresponding to gaps between the insulating segments so as to apply extra material to completely fill the gaps. The elastomer 18 bonds to the pipe 10 between the bands 14, and completely encapsulates the foam bands 14.

The elastomer material thus isolates each of the bands 14 from the others, effectively forming a watertight bulkhead between each segment of insulating foam. Accordingly, if the outer coating is punctured or ruptured, any flooding of the foam will be contained and localised, minimising any loss of thermal insulation resulting therefrom. The bulkhead structure also enhances the inherent strength of the elastomer coating itself, providing increased resistance to damage. Each of the insulating bands 14 might suitably extend along about 2 meters of the pipe.

The coated pipe may incorporate additional coating layers of various types. Typically, these would be applied on top of the anti-corrosion coat 12, prior to the application of the foam 14. FIG. 3 shows an embodiment of a pipe 30 having a coating incorporating a number of layers, as follows: an anti-corrosion layer 32 corresponding to the layer 12 of FIG. 1 and 2; a high temperature barrier coat 34, typically of foam or elastomer material; an impact shock absorbing coat 36, typically of soft elastomer or microcellular, semi-rigid foam; an intermediate elastomer layer, typically of high performance polyurethane elastomer; and insulating layer 40 of foam material, corresponding to the foam 14 of FIGS. 1 and 2, preferably of polyurethane foam which may be of various densities according to need, but typically high density foam; an outer, protective elastomer layer 42, corresponding to the elastomer 18 of FIG. 2, typically of high performance polyurethane elastomer.

One or more of the coating layers may incorporate one or more layers of mesh or woven reinforcing material embedded therein, typically of glass fibre or metal. Such a reinforcing mesh is indicated by broken line 44, incorporated in the shock coat 36.

It will be understood that the layers 34 to 38 which are additional to the basic coating layers of FIGS. 1 and 2 may be utilised in various combinations and permutations according to need.

Improvements and modifications may be incorporated without departing from the scope of the invention.

What is claimed is:

1. A thermally insulated pipe, comprising a steel pipe having a thermally insulating polyurethane foam material applied thereto in a plurality of discrete segments distributed over the surface thereof and encapsulated in a protective layer of elastomer material bonded to the pipe and filling the gaps between said segments.

2. The pipe of claim 1, wherein the thermally insulating material is disposed in annular bands spaced along the length of the pipe.

3. The pipe of claim 1, further comprising an initial anti-corrosion layer disposed on the pipe prior to the application of said thermally insulating material.

4. The pipe of claim 1, further comprising a high temperature barrier layer disposed on the pipe prior to the application of said thermally insulating material.

5. The pipe of claim 1, further comprising an impact shock absorbing layer disposed on the pipe prior to the application of the thermally insulating material.

6. The pipe of claim 1, further comprising an inner layer of elastomer material disposed on the pipe prior to the application of said thermally insulating material.

7. A method of applying a thermally insulating coating to a steel pipe, comprising the steps of applying a thermally insulating polyurethane foam material to the pipe in a plurality of discrete segments over the surface area of the pipe, and applying an outer protective coating of water-proof elastomeric material which bonds to the pipe between said segments, fills the gaps therebetween and forms an outer layer encapsulating the thermally insulating foam.

8. The method of claim 7 wherein the thermally insulating material applied to the pipe by the ribbon-pour method.

9. The method of claim 7, wherein the thermally insulating materials is applied in annular bands spaced along the length of the pipe.

10. The method of claim 7, wherein the outer elastomer material is applied by the ribbon-pour method.

11. The method of claim 7, where in the thermally insulating material and outer elastomer material are applied from a plurality of programmable applicator heads capable of applying said materials to the pipe in predetermined patterns and in predetermined thicknesses.

12. The method of claim 7, wherein said outer elastomer is solid polyurethane elastomer.

13. The method of claim 7, wherein an anti-corrosion layer is applied to the pipe prior to the application of said thermally-insulating material and said outer elastomer material.

14. The method of claim 7, where a high temperature barrier layer is applied to the pipe prior to the application of said thermally-insulating and outer elastomer materials.

15. The method of claim 7, method of claim 13, wherein said anti-corrosion layer consists of a member of the group comprising fusion bonded epoxy and elastomer.

16. The method of claim 7, wherein an impact shock absorbing layer is applied to the pipe prior to the application of said thermally-insulating material and said outer elastomer material.

17. The method of claim 7, wherein an inner layer of elastomer material is applied to the pipe prior to the application of said thermally insulating material and outer elastomer material.

* * * * *